(12) United States Patent
Kirkby

(10) Patent No.: US 7,640,282 B2
(45) Date of Patent: Dec. 29, 2009

(54) MATCHED FILTERING

(75) Inventor: Robert H Kirkby, Lincoln (GB)

(73) Assignee: British Telecommunications PLC, London (GB)

( * ) Notice: Subject to any disclaimer, the term of this patent is extended or adjusted under 35 U.S.C. 154(b) by 617 days.

(21) Appl. No.: 10/549,853

(22) PCT Filed: Mar. 5, 2004

(86) PCT No.: PCT/GB2004/000954

§ 371 (c)(1),
(2), (4) Date: Sep. 23, 2005

(87) PCT Pub. No.: WO2004/088530

PCT Pub. Date: Oct. 14, 2004

(65) Prior Publication Data

US 2006/0198471 A1    Sep. 7, 2006

(30) Foreign Application Priority Data

Mar. 31, 2003    (GB) ................... 0307415.0

(51) Int. Cl.
*G06F 17/10*    (2006.01)
(52) U.S. Cl. .............. 708/314; 708/300; 375/343
(58) Field of Classification Search ............ 708/30, 708/314; 375/343
See application file for complete search history.

(56) References Cited

U.S. PATENT DOCUMENTS

| | | | |
|---|---|---|---|
| 3,987,285 A | 10/1976 | Perry | |
| 4,025,772 A | 5/1977 | Constant | |
| 4,532,603 A * | 7/1985 | Gerard | 708/813 |
| 4,706,263 A | 11/1987 | von der Embse | |
| 6,312,384 B1 | 11/2001 | Chiao | |
| 6,330,292 B1 * | 12/2001 | Dent et al. | 375/343 |

FOREIGN PATENT DOCUMENTS

| | | |
|---|---|---|
| EP | 0379609 | 8/1990 |
| JP | 8272473 A | 10/1996 |
| WO | WO 00/54424 | 9/2000 |

OTHER PUBLICATIONS

Martinson, L; Digital matched filtering with pipelined floating point fast Fourier transforms (FFT's); Acoustics, Speech and Signal Processing, IEEE Transactions on; vol. 23; Apr. 1975 pp. 222-234.*

Cheng, "Visualization, Measurement, and Interpolation of Head-Related Transfer Functions (HRTF'S) with Applications in Electro-Acoustic Music", A dissertation submitted in partial fulfillment of the requirements for the degree of Doctor of Philosophy, 2001.

(Continued)

*Primary Examiner*—Lewis A Bullock, Jr.
*Assistant Examiner*—Michael Yaary
(74) *Attorney, Agent, or Firm*—Nixon & Vanderhye PC

(57) ABSTRACT

A signal is filtered by multiplying its Fourier transform by the Fourier transform of a reference sequence to which the filtering is to be matched. The reference sequence (e.g. a Golay sequence pair) is defined as an iterative combination of shorter sequences and its Fourier transform is generated by an iterative process of combining the Fourier transforms of a shorter starting sequence.

18 Claims, 1 Drawing Sheet

OTHER PUBLICATIONS

International Search Report dated Sep. 9, 2005.

Stockham, "High-Speed Convolution and Correlation", AFIPS conference proceedings, vol. 28, 1966, pp. 229-233, XP001079087.

Popovic, "Efficient Golay Correlator", Electronics Letters, IEE Stevenage, GB, vol. 35, No. 7, Aug. 19, 1999, pp. 1417-1428.

Golay, "Complementary Series", IRE Transactions on Information Theory, IEEE Inc. New York, US., vol. 7, Apr. 1961, pp. 82-87.

Budisin, "Efficient Pulse Compressor for Golay Complementary Sequences", Electronics Letters, IEE Stevenage, GB, vol. 27, No. 3, Jan. 1991, pp. 219-220.

Braun, "On Higher Order Autocorrelation Properties of Golay Complementary Sequences", ISIT 1997, Ulm, Germany, Jun. 29-Jul. 4, 1997.

Braun, "Dipulse-response Measurement of a Magnetic Recording Channel Using Golay Complementary Sequences", IEEE Transactions on Magnetics, vol. 34, No. 1, Jan. 1998, pp. 309-316.

* cited by examiner

Timing diagram of pulse sequence:
... $\delta(t + 3\lambda/2) + \delta(t + \lambda/2) + \delta(t - \lambda/2) - \delta(t - 3\lambda/2)$ ...

MATCHED FILTERING

This application is the US national phase of international application PCT/GB2004/000954 filed 5 Mar. 2004 which designated the U.S. and claims benefit of GB 0307415.0, dated 31 Mar. 2003, the entire content of which is hereby incorporated by reference.

BACKGROUND

1. Technical Field

The present invention is concerned with matched filtering. One example of the use of matched filtering is in imaging applications, where an original signal is input to some system which produces a response and one wishes to characterise the system by comparing the response with the original signal. Some examples of imaging systems are telecommunications line testing and optical time domain reflectometry, where the original signal is transmitted to the line, and the response obtained from the far (or near) end of the line. Another is ranging systems such as RADAR or SONAR where the original signal is transmitted as a radio or ultrasonic wave and the response consists of reflections of it from the surroundings. Others include magnetic recording channel characterisation, and spatial separation (spectroscopy).

2. Related Art

In general, the response may include the original signal, echoes of the original signal, distortion and noise. Conceptually, the characterisation involves examining the correlation between the original signal and the response in order to distinguish those aspects of the response that are a result of the original signal, rather than the result of some other signal, or other interference or noise. Noting that the correlation (or convolution) of two signals in the time domain is equivalent to a multiplication operation in the frequency domain, one can perform this task by multiplying the frequency spectrum of the response by the frequency spectrum of the original signal A common approach to implementation of matched filtering in this way is to form the Fourier transform of the response, multiply it by the Fourier transform of the original signal, and take the inverse Fourier transform of the product. A particularly attractive approach is to deal with signals containing a number of signal samples equal to a power of two, so that the transforms may be performed using the fast Fourier transform (FFT).

Of particular interest is the situation where the original signal consists of a series of pulses. In the analysis given below, such a sequence is considered as a series of Dirac impulses (i.e. idealised pulses of infinitesimal duration) of magnitude +1 or −1 at regular time intervals. In practice, of course the original signal will consist of a band-limited version of such an idealised sequence, For convenience of notation, such a sequence will sometimes be expressed as a binary number—where, for example, a pulse sequence (1, 1, 1, −1) would be represented as 1110.

The Golay complementary sequences are well known (see M. J. E. Golay, "Complementary Series", *IRE Transactions on Information Theory*, vol. 7, pp. 82-87, April 1961). They are pairs of finite binary sequences with certain useful autocorrelation properties.

We define the following notation:

$X^+$ is a binary sequence (e.g. 1110); $X^-$ is its inverse (e.g. 0001).

The concatenation of two such symbols represents the concatenation of the binary sequences—thus $X^+X^-$ would, with the example values just given, represent 11100001.

x(t) is the time domain sequence corresponding to $X^+$ (e.g.(+1,+1,+1,−1).

X(f) is the Fourier transform of x(t).

A Golay pair consists of two sequences $A^+$ and $B^+$, each of length N, having the property that the sum of the autocorrelation of a(t) and the autocorrelation of b(t) (both computed at a shift k) is 2N for k=0 and zero for all |k|>0. Examples of Golay pairs having lengths equal to a power of two may be generated by the following iteration formula (written in the binary notation), where a pair in which both sequences have $2^K$ bits is written $(A^+_K, B^+_K)$:

code of length $2^0$(=1): let $(A^+_0, B^+_0) = (1,1)$ code of length $2^{K+1}$: let $(A^+_{K+1}, B^+_{K+1}) = (A^+_K B^+_K, A^+_K B^-_K)$ For example, $(A^+_0, B^+_0) = (1,1)$ $(A^+_1, B^+_1) = (11, 10)$ $(A^+_2, B^+_2) = (1110, 1101)$ $(A^+_3, B^+_3) = (11101101, 11100010)$ etc.

This iteration produces only one pair for a particular value of K, whereas, in general, there are more: other examples can be generated from these examples using the procedures described in the Golay paper cited above.

BRIEF SUMMARY

A signal is filtered by multiplying its Fourier transform by the Fourier transform of a reference sequence to which the filtering is to be matched. The reference sequence (e.g., a Golay sequence pair) is defined as an iterative combination of shorter sequences and its Fourier transform is generated by an iterative process of combining the Fourier transforms of a shorter starting sequence.

BRIEF DESCRIPTION OF THE DRAWINGS

Some embodiments of the present invention will now be described, by way of example, with reference to the accompanying drawings, in which.

DETAILED DESCRIPTION OF EXEMPLARY EMBODIMENTS

Figure 1:
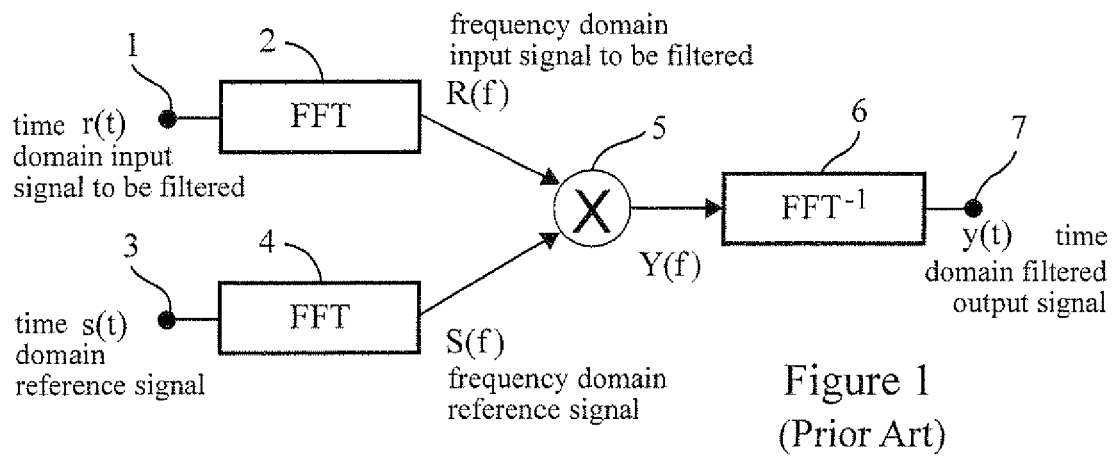
FIG. 1 is a block diagram of a conventional matched filter.

Conventionally, matched filtering may be performed in a number of ways, for example by means of a finite impulse response filter having tap weights chosen to correspond to the reference signal, or using the Fourier transform. FIG. 1 is a block diagram of a conventional matched filter of the latter type.

A signal r(t) to be filtered (perhaps the response received in an imaging application), and sampled at intervals τ is received at an input 1 and subjected at 2 to the fast Fourier transform to produce a frequency domain signal R(f). A reference signal s(t) (perhaps the original signal in an imaging application) representing the signal that the filter is to match, and consisting of regular pulses at intervals λ, is received at an input 3 and subjected at 4 to the fast Fourier transform to produce a frequency domain signal S(f). Note that the different symbols $\tau$, $\lambda$ are used for generality; in the conventional system $\lambda=\tau$ and the Fourier transforms are generated for discrete frequencies which are multiples of $1/2N\lambda=1/2N\tau$. It is observed that, in the imaging application, this is perfectly satisfactory provided that the receiver of r(t) has a timing reference that is synchronized to that used to generate the original signal s(t), and the phenomena being observed are perfectly stationary.

The product Y(f)=R(f)S(f) is formed by multipliers 5 and the product is transformed by an inverse fast Fourier transform at 6 back to a time domain signal y(t) which is output at 7.

The embodiment of the present invention now to be described is a matched filter of construction similar to that of FIG. 1, but avoids the use of the FFT in box 4. Moreover it admits of the possibility that the sampling period $\tau$ used for the signal r(t) to be filtered is not the same at the pulse period $\lambda$ of the reference signal s(t). This can be useful in imaging applications because it removes the necessity for synchronisation of the analogue parts of the receiver, since small timing differences can be accommodated digitally at a later stage in the processing; even with synchronisation, it can be useful for accommodating apparent timing differences due, for example due to Doppler shifts (as in RADAR).

Figure 2:
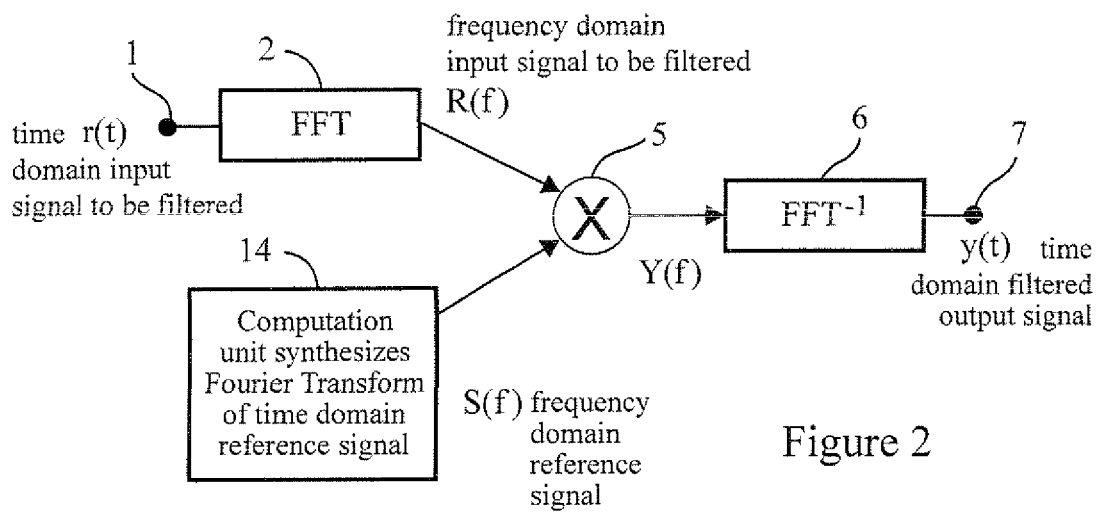
FIG. 2 is a block diagram of a matched filter operating in accordance with one embodiment of the invention.

Thus, in FIG. 2, the FFT 4 is replaced by a computation unit 14 which synthesises the Fourier transform of the reference signal s(t). Note that in this case the reference signal s(t) does not explicitly exist as a time domain signal; the computation only requires its binary representation $S^+$ (note that the notation $S^+$ is used to distinguish it from the Fourier transform S(t): $S^+$ is not necessarily one of a Golay pair).

Preparatory to explaining how this computation is performed, we revisit the question of the structure of the pulse sequence. The sequence consists of a series of Dirac impulses spaced at time intervals of $\lambda$, with a bit=1 represented by an impulse of amplitude +1 and a bit=0 represented by an impulse of amplitude −1. An impulse at t=0 is written $\delta(t)$: whilst an impulse at time T is written $\delta(t-T)$. (The term "amplitude" is used for convenience: strictly, a Dirac impulse has infinite amplitude and infinitesimal duration, but the product of these is finite. References to unit amplitude refer to a pulse in which this product is equal to unity).

Figure 3:
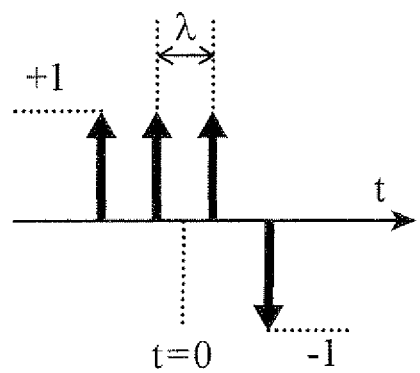
FIG. 3 is a timing diagram with one example of a pulse sequence utilized in the system of FIG. 2.

For a finite bit sequence the impulse train is by default centred on time t=0, so, for example: binary form Function of time "1110" $\delta(t+3\lambda/2)+\delta(t+\lambda/2)+\delta(t-\lambda/2)-\delta(t-3\lambda/2)$ This example sequence is shown in FIG. 3.

Any binary codeword can be generated from a single "1" by a combination of concatenation and inversion steps (and of course this also applies to the iteration formula given above for generating examples of Golay sequence pairs).

Bitstring inversion can be achieved in the equivalent time domain signal by multiplying the time function by −1. In the frequency domain it can be achieved by multiplying the Fourier transform by −1. This if a binary sequence $X^+$ is represented in the time domain by x(t) having Fourier transform X(f) then the inverse $X^-$ is represented in the time domain by −x(t) having Fourier transform −X(f)

Concatenation of two bitstrings $X^+$ and $Y^+$ can be achieved in the time domain by shifting the first function back in time, the second function forward in time, and adding them. If the first string has $N_x$ bits and the second has $N_y$ bits then the shifts are $\lambda N_x/2$ and $\lambda N_y/2$ respectively. In the frequency domain one multiplies the first spectrum by $\exp(+j2\pi f\lambda N_x/2)$ and the second by $\exp(-j2\pi f\lambda N_y/2)$ and then adds them.

Now, the Fourier transform of a single impulse $\delta(t)$ is 1.

The above equivalents are tabulated in Table 1:

| operation in | bitstring domain | time domain | frequency domain |
|---|---|---|---|
| notation | $X^+$ | x(t) | X(f) |
| initially | "1" | $\delta(t)$ | 1(f) |
| invert($X^+$) | $X^-$ | −x(t) | −X(f) |
| concatenate( $A^+$, $B^+$ ) where $A^+$ has $N_A$ bits where $B^+$ has $N_B$ bits | $A^+B^+$ | $a(t+\lambda N_B/2)$ + $b(t-\lambda N_A/2)$ | $A(f).\exp(+j\pi\lambda N_B f)$ + $B(f).\exp(-j\pi\lambda N_A f)$ |

Using these one can derive an iteration formula for the Fourier transforms of the Golay sequence pairs equivalent to that give earlier for the binary representation:

set $A_0(f):=1.0+j0.0$ set $B_0(f):=1.0+j0.0$ set $\phi_0:=\frac{1}{2}\lambda$ ($\phi$ being the period to shift the time functions in the next concatenation) for K:=1 to N do set $A_K(f):=A_{K-1}(f)\exp(+j2\pi\phi_{K-1}f)+B_{K-1}(f)\exp(-j2\pi\phi_{K-1}f)$ set $B_K(f):=A_{K-1}(f)\exp(+j2\pi\phi_{K-1}f)-B_{K-1}(f)\exp(-j2\pi\phi_{K-1}\_31\ 1f)$ set $\phi_K:=2\phi_{K-1}$ This computation needs to be performed for each value of f. For a sampled sequence the frequency spectrum is theoretically infinite, but repeats. Any frequency interval of width twice the Nyquist frequency can be taken, though conventionally it is usual to evaluate $f=n/2\tau M$ (n=−M+1 ... M) where M is the number of samples embraced by the FFT analysis at 2 (FIG. 2). Note that it is not necessary to evaluate for n=−M since the result is the same as for n=M; and that— noting that the transform for −f is the complex conjugate of that for f, one may choose to perform the recursion only for positive values of f and then derive those for negative values by taking the complex conjugate.

Note that there are alternative versions of the Fourier transform which are scaled versions of one another. The usual convention for FFT processing is that the Fourier transform of the unit impulse is 1/M; if this is desired then $A_0(f)$ and $B_0(f)$ should be initialised to 1/M rather than unity. Note at this point that we prefer, in the test method discussed, so send an effectively infinite sequence consisting of the concatenation $A^+B^+A^+B^-$ sent repeatedly (by "effectively infinite" we mean that transmission commences a sufficiently long time before measurement begins that transient effects have died away, and does not cease until after measurement is complete). (We prefer this sequence as it has the property of having no sidelobes within ¼ cycle of t=0). Lest it should appear surprising that the sequence is expressed in this form, a word of explanation is in order. We observe that, if the recursion formula given above is applied to the pair $(A_p^+,B_p^+)$, of some length $2^P$, to produce a pair of twice the length $(A_{P+1}^+,B_{P+1}^+)$, then transmission of the concatenation $A_{P+1}^+B_{P+1}^+$ amounts to the same thing as sending $A_P^+B_P^+A_P^+B_P^-$. Moreover, if one applies the recursion formula again to $(A_{P+1}^+,B_{P+1}^+)$ to give a pair $(A_{P+2}^+,B_{P+2}^+)$ of twice the length, then transmission of $A_{P+2}^+$ alone also amounts to the same thing as sending $A_P^+B_P^+A_P^+B_P^-$. However, whilst all pairs generated by this particular recursion have the property that if one takes one sequence of the pair and cuts it in half then one has a new (shorter) Golay pair, it is not in general true that all Golay pairs of length $2^n$ have this property (or at least, it has yet to be proved that this is so). Thus it cannot be assumed that a single Golay sequence will necessarily have this property. However this property can be guaranteed providing that the recursion is performed at least twice. Thus if an arbitrary Golay pair of any length, which may or may not have this property, is subjected twice to the recursion, the result will have this property. Except where the starting pair are of unit length, it follows that (given that the length of a member of a Golay sequence pair is always one or an even number) each member of the resultant pair will have a length of 8 or a multiple thereof. In this case the transmitted sequence is $A_{P+2}^+ A_{P+2}^+ A_{P+2}^+$ etc. The sequence to which the filter is to be matched is the sequence $A_P^+ B_P^+ A_P^+ B_P^-$: i.e. in this instance simply $A_{P+2}^+$. So the computation at 14 is required only to compute the Fourier transform $A_{P+2}(f)$.

As note earlier, signals occurring in reality do not consist of ideal Dirac impulses; any transmitted signal, nominally a sequence of such pulses is in fact a sequence of pulses each having a finite amplitude and frequency spectrum. Such a signal can be viewed mathematically as the convolution of the idealised Dirac sequence convolved with the shape $p_T(t)$ of a single pulse—and, if need be also with a pulse shape $p_R(t)$ to take account of pulse-shaping that may occur at the receiving end. In the frequency domain, the convolution of a(t) and $p_T(t)$ becomes simply the product of A(f) and P(f), where $P_T(f)$ is the Fourier transform of $p_T(t)$. It is standard practice to take this into account in any matched filtering process, but, for the sake of completeness, it is pointed out that, in FIG. 2, this may readily be implemented by multiplying S(f) by the complex conjugate of the Fourier transform of the pulse shape before applying it to the multiplier 5, i.e.

S(f) $P_T$(f) $P_R$(f).

It has already been noted that the recursion process produces only one example of a Golay pair of any particular length. For many applications this is sufficient—i.e. if one sequence of length $2^K$ is as good as any other then there is no motivation to seek others. However it may be that an alternative sequence is desired. For example one may want to transmit two sequences over the same system and be able to distinguish between them upon receipt. In such a case (as well as the option mentioned earlier of choosing different starting points for the recursion, Golay in his above mentioned paper offers six (time-domain) transformations which may be used singly or in combination to generated alternative sequences.

These too may be implemented in the frequency domain. Supposing that one has generated a Golay pair of Fourier transforms A(f),B(f) equivalent to a time domain pair a(f),b (f), then one can generate new pairs A'(f),B'(f), equivalent to new time-domain pairs a'(t),b'(t) as indicated in the following table:

| | time domain as proposed by Golay | frequency domain |
|---|---|---|
| a) | interchange: a'(t) = b(t); b'(t) = a(t) | A'(f) = B(f); B'(f) = A(f) |
| b) | time reversal of a(t) | A(f) = A*(f) (where * indicates the complex conjugate) |
| c) | time reversal of b(t) | B'(f) = B*(f) |
| d) | inversion: a'(t) = −a(t) | A'(f) = −A(f) |
| e) | inversion: b'(t) = −b(t) | B'(f) = −B(f) |
| f) | invert alternate bits of both a | convolve A(f) with G(f) (& similarly |

-continued

| time domain as proposed by Golay | frequency domain |
|---|---|
| and b, that is to say a'(t) = a(f).g(t) and b'(t) = b(t).g(t) where g(t) = (−1, 1, −1, 1, −1, 1 etc.) | for B). Since G(t) is a sinusoid of frequency ½λ, its Fourier transform G(t) is simply two Dirac impulses at ± f. Thus A(f)*G(f) is given by $\pm jA\left(f - \frac{1}{2\lambda}\right) \mp jA\left(f + \frac{1}{2\lambda}\right)$. |

Some variations on this process will now be discussed:

The starting point for the recursion above was $(A_0(f),B_0(f))=(1,1)$. In fact one can start with any Golay pair, of any length. Inter alia this includes $(A_0(f),B_0(f))=(1,1)$ or (1,−1) or (−1,1) (−1, −1).

Windowing in t: Usually we shall be interested in analysing data, obtained by measurement, to identify instances of a codeword waveform somewhere in it. A naive approach would be to use a code cycle which just fits the FFT; this may even be a good idea for applications where the source and analyser can be sure of identical clock frequencies. However for the general case we will want a guard period at the beginning and end of the time block to prevent spurious responses from partial codewords. This may be achieved by using a block which is a multiple (at least twice) of the length of the codeword being sought, and analysing with a matched filter representing a single cycle and zero outside that cycle (the analyser cycle is assumed centred at time t=0). The guard is achieved by ignoring any response within half a cycle of the block edges.

Windowing in f: The shift operations, and their exp(−j2π shift f) multiplications, will in general produce discontinuities in the spectrum at the Nyquist band edges. This will not happen when the λ value is an exact multiple of τ (when the exp( ) factors join smoothly at the edges) but we will in general be interested in cases where λ is only approximately equal to τ.

As we are interested here in real valued signals in time, we would expect Hermite symmetry to be maintained in any spectrum. In particular we would expect X[0] and X[$f_{Nyquist}$] to be real. So at the very least we would expect the values stored at the Nyquist frequency to be forced to be real, whatever the process actually calculates.

The usual solution for such a discontinuity is windowing in the frequency domain—i.e. tapering the spectrum to zero as the band edges are approached. The consequence of not doing so, and just tolerating the discontinuity at $f_{Nyquist}$ is that any narrow time domain feature will appear as a sinc( ) function displaced from the time sampling grid—it will acquire a skirt of sidelobes, providing a slowly decaying noise floor at about −15 dB below the feature's peak.

There are many suitable window functions in the literature, all with slightly different virtues. The root raised cosine window is a convenient one to choose.

Golay's paper also discusses alternative recursions for the generation of Golay sequences. For example, the recursion may, rather than concatenating the bits of A⁺ and B⁺ (or B⁺), interleave the bits. In the time domain, this amounts to expanding the pulse sequence along the time axis, shifting, and adding. This scheme too may be implemented by analogous operations in the frequency domain, though it may be simplified by, rather than regarding the time domain operation as taking a sequence (for example) A⁺ and B⁺ with constant pulse spacing and successively doubling the sequence period, one can instead regard it as generating sequences of constant period and pulse spacing halving at each step. If starting with a sequence of length 1 and wanting a Golay pair each of $2^N$ pulses, so there are to be N iterations, then one desires a sequence period of $2^N\lambda$, and starts with a notional of pulse spacing of $2^N\lambda$; the first shift is $2^N\lambda/4$.

The recursion is as follows:

set $A_0(f):=1.0+j0.0$ set $B_0(f):=1.0+j0.0$ set $\theta_0:=2^{N-2}\lambda$ ($\theta$ being the period to shift the time functions in the next concatenation) for $K:=1$ to $N$ do set $A_K(f):=A_{K-1}(f)\exp(+j2\pi\theta_{K-1}f)+B_{K-1}(f)\exp(-j2\pi\theta_{K-1}f)$ set $B_K(f):=A_{K-1}(f)\exp(+j2\pi\theta_{K-1}f)-B_{K-1}(f)\exp(-j2\pi\theta_{K-1}f)$ set $\theta_K:=\theta_{K-1}/2$ As before, one may initially set $A_0(f),B_0(f)$ to be the Fourier transforms of any Golay pair. Note however that this process will not necessarily produce sequences having the sidelobe property discussed earlier, and if this is required this can be achieved by generating sequences which are a quarter of the desired length and subsequently performing two iterations of the recursion described earlier.

What is claimed is:

1. A method of matched filtering in accordance with a reference signal sequence comprising a plurality of signal samples at regular sampling time intervals $\lambda$, said method comprising the use of apparatus to effect the following operations:

receiving an input time domain signal r(t) to be filtered;
sampling the input time domain signal r(t), at sampling time intervals $\tau$ that are not synchronized to the sampling intervals $\lambda$ of the reference signal sequence, to produce an input signal sequence;
computing the Fourier transform of the input signal to be filtered evaluated at discrete frequencies f determined by the intervals $\tau$ at which the input signal is sampled;
computing the Fourier transform of the reference sequence, evaluated at the same discrete frequencies f;
forming the product of the two Fourier transforms; and
computing the inverse Fourier transform of said product to produce an output time domain signal y(t) representing, a filtered version of the input time domain signal;
wherein the reference sequence is defined as a function of time by a process of iteratively combining shifted versions of shorter sequences, and
wherein computing the Fourier transform of the reference sequence comprises an iterative process of combining the Fourier transforms of a shorter starting sequence using only the operations of inverting, addition, and multiplication, or equivalents thereof, performed by machine implemented digital signal processing.

2. A method according to claim 1 in which the reference signal sequence is represented by a Golay sequence pair and the step of computing the Fourier transform of the reference signal sequence comprises use of a computation unit which repeatedly:

(a) combines the Fourier transform of a first member of a Golay pair with the Fourier transform of the second member of that Golay pair to produce a first member of a new Golay pair; and (b) combines the Fourier transform of a first member of a Golay pair with the Fourier transform of the second member of that Golay pair to produce a second member of a new Golay pair.

3. A method according to claim 2 in which said combining uses only the machine implemented operations of digital signal inverting, addition, and multiplication by $\exp(\pm j2\pi f\Phi)$, where f is frequency and $\Phi$ is a shift value dependent on the length of the sequence.

4. A method according to claim 3 in which the transforms $A_K(f)$, $B_K(f)$ of a Golay pair are formed from the transforms $A_{K-1}(f)$, $B_{K-1}(f)$ of a shorter such pair according to the relationships $A_K(f):=A_{K-1}(f)\exp(+j2\pi\Phi f)+B_{K-1}(f)\exp(-j2\pi\Phi f)$ $B_K(f):=A_{K-1}(f)\exp(+j2\pi\Phi f)-B_{K-1}(f)\exp(-j2\pi\Phi f)$ where $\Phi$ is half the length of each member of the shorter pair, and f is frequency.

5. A method according to claim 3 in which the transforms $A_K(f)$, $B_K(f)$ of a Golay pair are formed from the transforms $A_{K-1}(f)$, $B_{K-1}(f)$ of a shorter such pair according to the relationships $A_K(f):=A_{K-1}(f)\exp(+j2\pi\theta_{K-1}f)+B_{K-1}(f)\exp(-j2\pi\theta_{K-1}f)$ $B_K(f):=A_{K-1}(f)\exp(+j2\pi\theta_{K-1}f)-B_{K-1}(f)\exp(-j2\pi\theta_{K-1}f)$ where $\theta$ are time intervals dependent on the number of iterations, and f is frequency.

6. A method according to claim 4 in which the iteration commences with a Golay pair each member of which has a length of 1.

7. A method according to claim 2 in which said combining uses only the operations of inverting, addition, and multiplication by $\exp(\pm j2\pi f\Phi)$ where f is frequency and $\Phi$ is a shift value dependent on the length of the sequence.

8. A method according to claim 7 in which the transforms $A_K(f)$, $B_K(f)$ are formed from the transforms $A_{K-1}(f)$, $B_{K-1}(f)$ of a shorter such pair according to the relationships $A_K(f):=A_{K-1}(f)\exp(+j2\pi\Phi f)+B_{K-1}(f)\exp(-j2\pi\Phi f)$ $B_K(f):=A_{K-1}(f)\exp(+j2\pi\Phi f)+B_{K-1}(f)\exp(-j2\pi\Phi f)$ where $\Phi$ is half the length of each member of the shorter pair, and f is frequency.

9. A method according to claim 7 in which the transforms $A_K(f)$, $B_K(f)$ are formed from the transforms $A_{K-1}(f)$, $B_{K-1}(f)$ of a shorter such pair according to the relationships $A_K(f):=A_{K-1}(f)\exp(+j2\pi\theta_{K-1}f)+B_{K-1}(f)\exp(-j2\pi\theta_{K-1}f)$ $B_K(f):=A_{K-1}(f)\exp(+j2\pi\theta_{K-1}f)+B_{K-1}(f)\exp(-j2\pi\theta_{K-1}f)$ where $\theta$ are time intervals dependent on the number of iterations, and f is frequency.

10. A matched signal filtering apparatus using a reference signal sequence comprising a plurality of signal samples at regular sampling time intervals $\lambda$, said apparatus comprising:

means for receiving an input time domain signal r(t) to be filtered;
means for sampling the input time domain signal r(t), at sampling time intervals $\tau$ that are not synchronized to the sampling intervals $\lambda$ of the reference signal sequence, to produce an input signal sequence;

means for computing the Fourier transform of the input signal to be filtered evaluated at discrete frequencies f determined by the intervals τ at which the input signal is sampled;

means for computing the Fourier transform of the reference sequence, evaluated at the same discrete frequencies f;

means for forming the product of the two Fourier transforms; and means for computing the inverse Fourier transform of said product to produce an output time domain signal y(t) representing a filtered version of the input time domain signal;

wherein the reference sequence is defined as a function of time by a process of iteratively combining shifted versions of shorter sequences, and wherein computing the Fourier transform of the reference sequence comprises an iterative process of combining the Fourier transforms of a shorter starting sequence using only the operations of inverting, addition, and multiplication, or equivalents thereof, performed by machine implemented digital signal processing.

11. Apparatus according to claim 10 in which the reference signal sequence is represented by a Golay sequence pair and the means for computing the Fourier transform of the reference signal sequence comprises use of a computation unit which repeatedly:
(a) combines the Fourier transform of a first member of a Golay pair with the Fourier transform of the second member of that Golay pair to produce a first member of a new Golay pair; and
(b) combines the Fourier transform of a first member of a Golay pair with the Fourier transform of the second member of that Golay pair to produce a second member of a new Golay pair.

12. Apparatus according to claim 11 in which said computation unit uses only the machine-implemented operations of digital signal inverting, addition, and multiplication by $\exp(\pm j2\pi f\Phi)$, where f is frequency and $\Phi$ is a shift value dependent on the length of the sequence.

13. Apparatus according to claim 12 in which the transforms $A_K(f)$, $B_K(f)$ of a Golay pair are formed from the transforms $A_{K-1}(f)$, $B_{K-1}(f)$ of a shorter such pair according to the relationships $$A_K(f) := A_{K-1}(f) \exp(+j2\pi\Phi f) + B_{K-1}(f) \exp(-j2\pi\Phi f)$$

$$B_K(f) := A_{K-1}(f) \exp(+j2\pi\Phi f) - B_{K-1}(f) \exp(-j2\pi\Phi f)$$

where $\Phi$ is half the length of each member of the shorter pair, and f is frequency.

14. Apparatus according to claim 12 in which the transforms $A_K(f)$, $B_K(f)$ of a Golay are formed from the transforms $A_{K-1}(f)$, $B_{K-1}(f)$ of a shorter such pair according to the relationships $$A_K(f) := A_{K-1}(f) \exp(+j2\pi\theta_{K-1}f) + B_{K-1}(f) \exp(-j2\pi\theta_{K-1}f)$$

$$B_K(f) := A_{K-1}(f) \exp(+j2\pi\theta_{K-1}f) - B_{K-1}(f) \exp(-j2\pi\theta_{K-1}f)$$

where θ are time intervals dependent on the number of iterations, and f is frequency.

15. Apparatus according to claim 13 in which the iteration commences with a Golay, each member of which has a length of 1.

16. Apparatus according to claim 11 in which said combining uses only the operations of inverting, addition, and multiplication by $\exp(\pm j2\pi f\Phi)$ where f is frequency and $\Phi$ is a shift value dependent on the length of the sequence.

17. Apparatus according to claim 16 in which the transforms $A_K(f)$, $B_K(f)$ are formed from the transforms $A_{K-1}(f)$, $B_{K-1}(f)$ of a shorter such pair according to the relationships $$A_K(f) := A_{K-1}(f) \exp(+j2\pi\Phi f) + B_{K-1}(f) \exp(-j2\pi\Phi f)$$

$$B_K(f) := A_{K-1}(f) \exp(+j2\pi\Phi f) + B_{K-1}(f) \exp(-j2\pi\Phi f)$$

where $\Phi$ is half the length of each member of the shorter pair, and f is frequency.

18. Apparatus according to claim 16 in which the transforms $A_K(f)$, $B_K(f)$ are formed from the transforms $A_{K-1}(f)$, $B_{K-1}(f)$ of a shorter such pair according to the relationships $$A_K(f) := A_{K-1}(f) \exp(+j2\pi\theta_{K-1}f) + B_{K-1}(f) \exp(-j2\pi\theta_{K-1}f)$$

$$B_K(f) := A_{K-1}(f) \exp(+j2\pi\theta_{K-1}f) + B_{K-1}(f) \exp(-j2\pi\theta_{K-1}f)$$

where θ are time intervals dependent on the number of iterations, and f is frequency.

* * * * *